(No Model.) 2 Sheets—Sheet 1.
J. S. KIDD.
WAGON DUMP AND ELEVATOR.
No. 358,457. Patented Mar. 1, 1887.
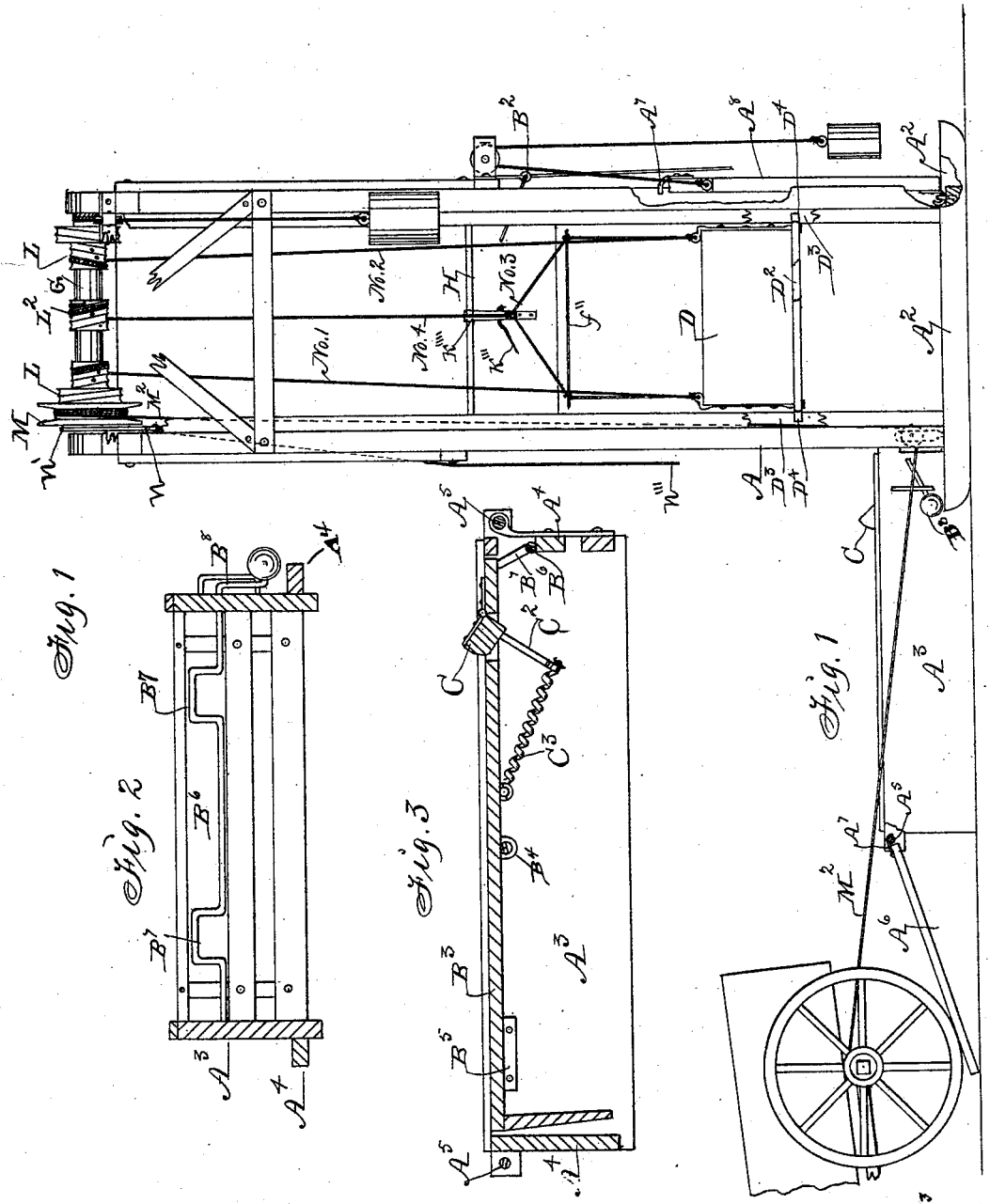

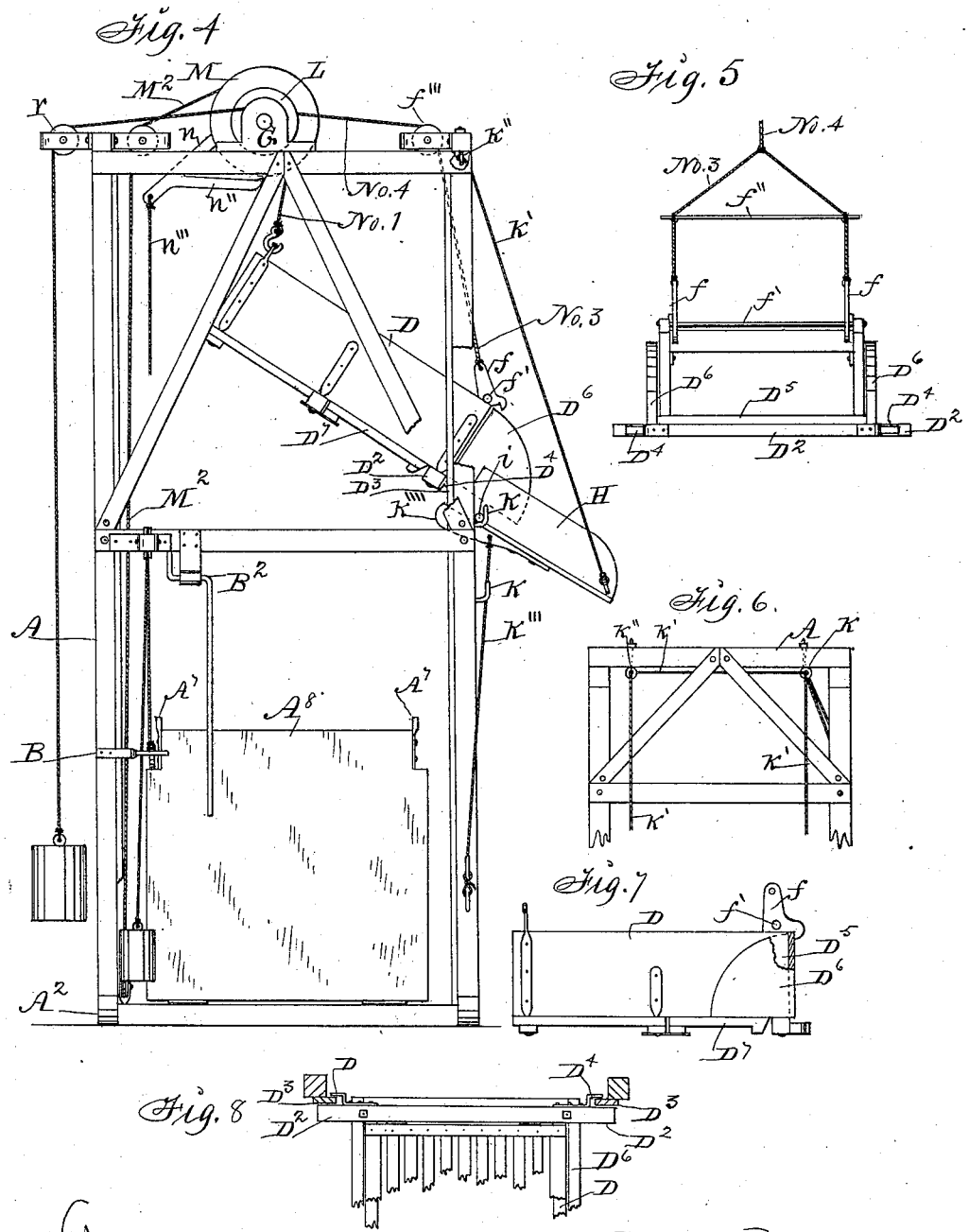

UNITED STATES PATENT OFFICE.

JOHN S. KIDD, OF DES MOINES, IOWA.

WAGON-DUMP AND ELEVATOR.

SPECIFICATION forming part of Letters Patent No. 358,457, dated March 1, 1887.

Application filed May 14, 1886. Serial No. 202,219. (No model.)

*To all whom it may concern:*

Be it known that I, JOHN S. KIDD, a citizen of the United States of America, and a resident of Des Moines, in the county of Polk and State of Iowa, have invented certain new and useful Improvements in Wagon-Dumps and Elevators, of which the following is a specification.

My object is to facilitate the unloading of corn, potatoes, &c., placed in bulk upon wagons and sleds, and to elevate and convey such farm products into cribs, bins, cars, or wherever desired, and also to facilitate reloading such stored products upon vehicles, as required in removing them from one place to another.

Heretofore track-rails have been pivoted in a platform for the purpose of dumping a wagon placed upon the rails, and a cross-section of a platform has been hinged for the purpose of lowering one end of a wagon, and a box adapted to receive the contents of a wagon has been combined with a derrick and hoisting mechanism.

My invention consists in the construction and combination of a platform having a single wide and pivoted floor-section adapted to receive and dump a wagon or sled, an elevator-box and dirt-separator, and mechanism for lifting and automatically opening the box to discharge its contents at any point of elevation desired, and an adjustable chute for conveying the elevated substances into a car or crib, as hereinafter fully set forth, pointed out in my claims, and illustrated in the accompanying drawings, in which—

Figure 1 is a side view of my complete apparatus, showing the elevator-box ascending as the empty wagon is moving off the dumping-platform. Fig. 2 is an enlarged transverse section, and Fig. 3 a longitudinal section, of the dumping-platform, showing the tilting floor, the automatic wheel-scotching device, and the floor supporting and tripping mechanism. Fig. 4 is a side elevation of the elevator-frame, the elevator-box, and the adjustable chute in position as required for use. Fig. 5 is an end view of the elevator-box and the automatic mechanism for opening and closing the hinged end-gate. Fig. 6 is a front view of a section of the elevator-frame, showing the rope-supports by means of which the adjustable chute is moved and suspended. Fig. 7 is a side view of the elevator-box combined with the corner-posts of the frame and provided with a dirt-separating bottom. Fig. 8 is a bottom view of a section of the box combined with the guides and posts of the elevator-frame.

A represents an elevator-frame composed of four corner-posts, cross-pieces, and braces that may vary in size as desired, and that are framed or otherwise rigidly fixed together.

$A^2$ are the side pieces of the base of the frame, that project in opposite directions from the posts to widen the base of the frame and to serve as runners in moving the position of the frame relative to a car or corn-crib.

$A^3$ are the sides, and $A^4$ the ends, of a platform that is about ten feet long, seven feet wide, and two feet high, placed at one end of the base of the elevator-frame. The sides $A^3$ have projections at their top corners, through which stay-rods $A^5$ are passed and secured by means of nuts to aid in strengthening the platform and to serve in securing removable and inclined platform ends.

$A^6$ is an inclined platform-section that has hooks $A^7$ at its top end to engage the rod $A^5$, for the purpose of detachably fastening the section to the end of the platform.

$A^8$ is a removable inclined platform-section, provided with hooks $A^7$ to engage the rod $A^5$ at the opposite end of the platform. It is detachably hinged by means of hooks and eyes, or in any suitable way, to the cross-piece of the base of the elevator-frame in such a manner that it can be turned into vertical position after a wagon has passed over it, as required to let the elevator-box down upon the ground to receive the contents dumped from the wagon-box. A weight attached to a cord that is passed over a pulley, as shown in Fig. 1, retains the hinged section in a vertical position. A stop, B, fixed to the elevator-frame, prevents the hinged section from turning outward relative to the frame.

$B^2$ is a rock-shaft in a bearing fixed to the frame. It has a short arm that extends inward and upward and a long arm that extends downward in such a manner that when the elevator-box is hoisted the box will come in contact with the short arm and rock the shaft, so as to press the long arm inward and against the hinged section $A^8$, as required, to let the section descend by force of gravity to hook fast to the rod $A^5$ of the dumping-platform again.

$B^3$ is the floor of the dumping-platform, pivoted by means of an axle, $B^4$, that has its bearings formed in or fixed to the sides $A^3$.

$B^5$ represents a stop fixed to the sides to support the floor level when a wagon is advanced upon it.

$B^6$ is a rock-shaft, pivoted to the end of the platform-frame in such a manner that lateral bends $B^7$ in the shaft will serve as props to aid in supporting the pivoted floor level.

$B^8$ is a weighted arm on the end of the shaft that will in its normal position keep the lateral bends engaged with the end of the pivoted floor. By simply lifting the weighted arm the bends in the shaft are withdrawn from under the floor to let the floor tilt as required to dump a wagon.

C is a wheel-scotching bar pivoted in a transverse opening in the floor $B^3$. It has an arm, $C^2$, projecting downward, and a spring, $C^3$, fixed to the end of the arm and to the under side of the floor in such a manner that the spring will in its normal condition retain the bar turned upward above the level of the floor as required to prevent a wagon from moving backward on the floor when the floor is tilted to dump the wagon. When the wagon is advanced upon the platform, the wheels depress the scotching-bar and store power in the spring that is released as quick as the wheels have passed the bar and exerted in elevating the bar and scotching the wheels. $A^4$ (shown in Fig. 2) are blocks fixed to the sides $A^3$ of the platform, to engage the projecting ends of the base-pieces $A^2$ of the frame, for the purpose of preventing any lateral movement of the platform relative to the elevator-frame.

D is an elevator-box adapted in size and shape to move up and down within the elevator-frame. It has a cross-bar, $D^2$, fixed under its rear end, that projects in opposite directions from the box to engage re-enforcing strips or guides $D^3$, fixed to the posts of the elevator-frame, as clearly shown in Fig. 8.

$D^4$ are irons fixed to the cross-bar $D^2$, so shaped and located that their free ends will overlap the guides $D^3$. (In lieu of the guides $D^3$, fixed against the posts, grooves may be formed in the posts to admit the ends of the irons $D^4$.)

$D^5$ is an end-gate hinged to the bottom of the rear end of the box.

$D^6$ are side pieces fixed to the ends of the gate $D^5$, to overlap the sides of the box when the gate is closed and to serve as extensions to the sides of the box when the gate is open, as shown in Fig. 4, as required to empty the contents of the box.

$D^7$ is a hinged section of the bottom of the box, that will serve as a chute, as indicated by dotted lines in Fig. 4, in emptying the contents of the box into a wagon placed in the base of the elevator-frame to be reloaded, as hereinafter set forth. The bottom of the box is composed of a frame and bars or rods, as shown in Fig. 8, for the purpose of allowing dirt or snow to fall through and be separated from corn, potatoes, &c., that may have such foreign substances mixed therewith.

$f$ are elbow-shaped latches pivoted to the top and rear corners of the box D by means of a rod, $f'$, to engage the top edge of the end-gate $D^5$, and lock it when closed, as shown in Fig. 7.

Nos. 1 and 2 are ropes detachably connected with the corners of the front end of the elevator-box by means of hooks and eyes, and to a winch, G, at the top and center of the elevator-frame.

No. 3 is a rope fixed to the top ends of the latches $f$.

$f''$ is a bar provided with eyes at its ends to admit the rope No. 3 and to keep the ends of the rope perpendicular, while its center is lifted by means of a rope, No. 4, attached thereto and passed over a pulley, $f'''$, at the top of the frame and fastened to the center of the winch. As the box is elevated by means of the ropes and its front end raised higher than its rear end, the pivoted latches $f$ remain perpendicular, while the box assumes an inclined position, and the end-gate $D^5$ is thus automatically unlocked and allowed to open as required to let the contents of the box slide out over the chute into a bin, car, or other receptacle under the chute.

H is an adjustable chute that has pins $i$ projecting laterally from its top, end, and bottom portion to engage hooks $k$, fixed to the posts of the elevator-frame. Ropes $k'$, fixed to the opposite ends of the chute, are passed through eyes $k''$ at the top of the frame, as shown in Fig. 6, and then united and brought down, to be detachably fastened to a cleat fixed to the frame in such a manner that the chute can be suspended in an inclined position and at any angle desired by simply shifting it from one pair of hooks $i$ to another and stretching and fastening the ropes $k'$.

$k'''$ is a rope fixed to the under side of the chute and adjustably fastened to a cleat on the lower portion of the frame to aid in retaining the chute stationary when in use.

$k''''$ represents a cam fixed to the under side and center of the chute to project upward in such a manner that when the elevator-box descends the open gate will come in contact with the cam to be automatically closed by means of the cam.

L L are mating drums fixed to the axle of the winch G. Each drum has two diameters and a continuous spiral groove extending from one end to the other in such a manner that the ropes Nos. 1 and 2, detachably connected with their smallest portions, will be readily coiled upon the drums when they are revolved as required to elevate the box attached to their lower ends. The largest diameter of each of the drums L is about sixteen inches and the smallest diameter about ten inches.

$L^2$ is a drum of about ten inches diameter fixed to the center of the winch-axle (which axle is about eight inches in diameter) and the end of the rope No. 4 detachably fastened to the periphery of the drum.

M is a grooved wheel of about thirty inches diameter fixed at the end portion of the axle of the winch.

$M^2$ is a rope fastened in the groove of the wheel and passed downward and over a directing-pulley at the base of the frame, and from thence along the side of the dumping-platform in such a manner that when the wagon is dumped the rope can be attached to the wagon, so that it will be stretched and drawn out as the wagon is moved off the platform, for the purpose of operating the winch and thereby elevating the box that received the contents dumped from the wagon.

$n$ is a lever pivoted to the elevator-frame and provided with a hook on its end to engage a ratchet-wheel, $n'$, fixed on the axle of the winch and on the outside of the wheel M in such a manner that it will by force of gravity back the winch.

$n''$ is an arm extending from the lever $n$ to engage the wheel M and serve as a brake for governing the descent of the box when the winch is unlocked by pulling on a rope, $n'''$, attached to the lever to disengage the hook on the end of the lever from the ratchet-wheel $n'$.

In the practical use of my invention, when the elevator-frame is placed in position aside of a building or car, the platform must be level and adjusted relative to the base of th frame, so as to allow the hooks on the free end of the hinged and inclined section $A^3$ to engage the rod $A^5$. The free end of the inclined section $A^6$, attached to the opposite end of the platform, will rest upon the ground, whether the surface is higher or lower than the surface upon which the platform rests, and therefore is practically self-adjusting.

From the foregoing descriptions of the construction and function of each element and sub-combination and the placing of the apparatus the unitary actions of all the parts and the practical operation of the complete invention will be obvious, so that any person of ordinary skill can dump a load from a wagon therewith and then elevate and convey the matter into a bin or car by means of the wagon and horses attached thereto.

To reload a wagon, as required in removing corn from a crib, I place the elevator-frame aside of the crib and the elevator-box on the ground and within the base of the elevator, and then connect a chute with a frame in such a manner that the corn may be conducted from the crib into the box at pleasure by means of the chute. I remove the platform and pass the rope $M^2$ over a pulley, $M^3$, located at some distance from the elevator, and fasten the rope to the wagon that is to be loaded and drive toward the elevator-box and thereby raise the box, so that I can place the wagon immediately under it and dump its contents into the wagon-box.

When the ropes Nos. 1 and 2, fastened to the smallest and inner ends of the drums L, are drawn out and coiled upon the outer and larger ends and the rope No. 4 is drawn off the drum $L^2$ and coiled upon the axle, the take-up motion of the ropes Nos. 1 and 2 is increased in speed and the front end of the elevator-box moved upward faster and the rear end slower, as required to dump its contents into the chute H. The resisting force that must be overcome by the horses attached to the wagon is increased in accordance with the increased leverage of the drums, so that there will be a tendency to check and stop the horses at the time the elevator-box is in proper position to dump its contents; and when the box is empty I detach the rope from the wagon, drive another loaded wagon upon the platform, and then lower the elevator-box into position to receive its contents by simply pulling on the rope $n'''$ to operate the lever $n$ and brake $n''$.

To adjust the ropes Nos. 1, 2, and 4 on the winch, as required to lift the elevator-box to the different heights at which the chute H may be placed, I simply shift the hooks on their ends in the perforations in the peripheries of the drums, so that the box will be brought into an inclined position at the chute. Diminishing the number of coils on the drum $L^2$ and on the small ends of the drums L causes the box to be dumped at a lower point of elevation. Increasing the coils causes the dumping to occur at a higher point of elevation.

To prevent the elevator-box from descending too rapidly and to dispense with a brake, I fasten a rope to the winch-axle and then pass it over a pulley, $r$, at the top of the frame and attach a weight to its end, as shown in Fig. 4, to balance the weight of the box.

I am aware that an inclined platform has been combined with an elevator-frame and an elevator-box in such a manner that the contents of a wagon on the inclined platform can be dumped into the box and a hoisting-rope then attached to the wagon to elevate the box as the wagon is moved from the platform; but a platform having a single pivoted floor-section and a scotching device on the end of said section placed at the side of an elevator-frame, as shown and described, so that a loaded wagon can be supported in a level position above the elevator-box and its contents readily dumped into the box and hoisted as the wagon descends from the platform is greatly advantageous, in that the wagon can be more easily and safely placed and retained upon the level platform to be dumped at pleasure than to retain the wagon upon an inclined platform.

I claim as my invention—

1. In a wagon-dumping platform, the combination of a frame having the main portion of its floor pivoted near its center, a wheel-scotching bar pivoted in a transverse slot formed in one of the end portions of the pivoted floor, mechanism for returning the scotching-bar, mechanism for supporting the pivoted floor level, and mechanism for tilting the same floor, all substantially as described.

2. The pivoted scotching-bar C, having an arm, $C^2$, and the spring $C^3$, in combination with a pivoted floor or floor-section in a platform, to operate in the manner set forth, for the purposes stated.

3. The combination of the rock shaft $B^6$, having bends $B^7$ and a weighted arm, $B^8$, with a platform having a pivoted floor or floor-section, $B^3$, to operate in the manner set forth, for the purposes stated.

4. In a wagon-dumping platform, the combination of a single pivoted floor-section adapted to support a wagon or sled, a wheel-scotching bar fitted in a transverse opening in said pivoted section, and mechanism for operating said bar in said opening, for the purposes stated.

5. The combination of a pivoted floor or floor-section in a wagon-dumping platform, a wheel-scotching device pivoted in a transverse slot in one of the end portions of said pivoted floor or floor-section, mechanism for supporting the tilting floor or section in a level position, and detachable and inclined platform ends, for the purposes stated.

6. A portable elevator-frame, A, having an enlarged base, $A^2$, a movable platform having a rod, $A^5$, at its end, a platform-section, $A^8$, hinged to the elevator-base at its lower end, and a rock-shaft, $B^2$, arranged and combined to operate in the manner set forth, for the purposes stated.

7. The combination of the latch devices $f$, the bar $f'''$, and ropes Nos. 3 and 4 with the end and top of a box, and an end-gate hinged to the bottom and end of the same box, and mechanism for hoisting and inclining the box, for the purposes stated.

8. An elevator-box provided with the latch devices $f$ and the end-gates $D^5 D^6$, and having attached thereto the ropes 1, 2, 3, and 4, in combination with a winch having drums of unequal diameter and the other ends of the said ropes connected thereto, for the purposes stated.

9. The adjustable chute H, having pins $i$, the ropes $k'$ and $k'''$, in combination with an elevator-frame having fixed hooks $k$ and fixed eyes $k''''$, for the purposes stated.

10. In an elevator and dump, the combination of a winch having the drums L and $L^2$, the hoisting-ropes Nos. 1, 2, and 4, and an elevator-box having a gate at one of its ends, to operate in the manner set forth, for the purposes stated.

11. A wagon-dumping platform having a single pivoted floor-section, mechanism for supporting said pivoted section level, a wheel-scotching device attached near the end of the said pivoted section, an elevator-frame, and an elevating-box within the said frame, arranged and combined to operate in the manner set forth, for the purposes stated.

12. A wagon-dumping platform having a single pivoted floor-section adapted to support a wagon or sled, a wheel-scotching device carried at the end of said pivoted floor-section, mechanism for supporting said pivoted floor-section, an elevator-frame at the end of said dumping-platform, a vertically-moving box in said elevator-frame, and a hoisting-rope connected with said elevator box and frame and adapted to be attached to a wagon upon the dumping-platform, arranged and combined to operate in the manner set forth.

JOHN S. KIDD.

Witnesses:
 THOMAS G. ORWIG,
 D. G. RHOADS.